(No Model.) 3 Sheets—Sheet 1.

T. P. FORD.
ELEVATOR.

No. 427,065. Patented May 6, 1890.

Witnesses
Philip M Justice
Allen ?

Inventor
Thos. P. Ford (No Model.) 3 Sheets—Sheet 2.

T. P. FORD.
ELEVATOR.

No. 427,065. Patented May 6, 1890.

Witnesses. Inventor.

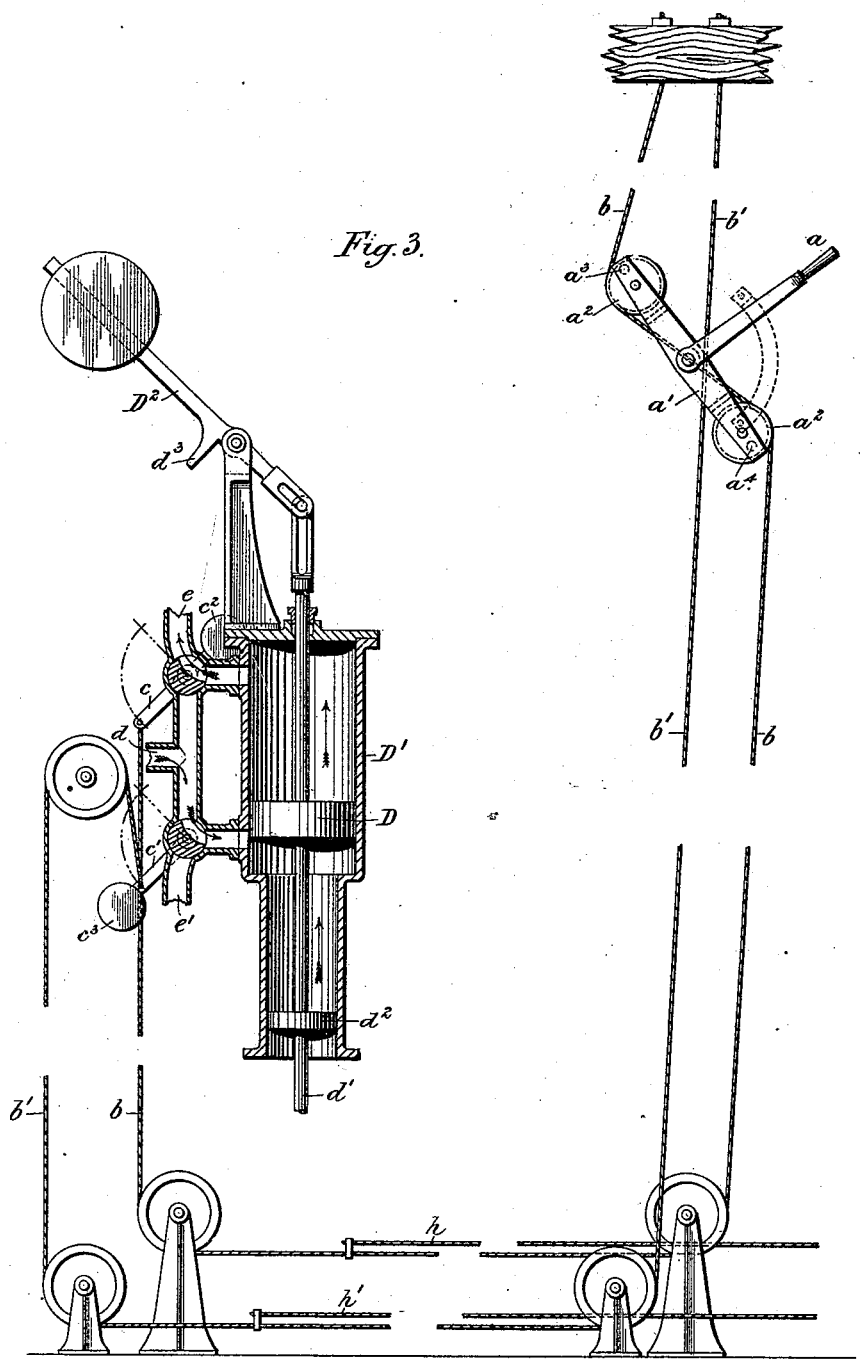

UNITED STATES PATENT OFFICE.

THOMAS P. FORD, OF LONDON, ENGLAND, ASSIGNOR OF ONE-HALF TO WILLIAM AUGUSTUS GIBSON, OF SAME PLACE.

ELEVATOR.

SPECIFICATION forming part of Letters Patent No. 427,065, dated May 6, 1890.

Application filed November 14, 1888. Serial No. 290,780. (No model.)

*To all whom it may concern:*

Be it known that I, THOMAS POWNALL FORD, a citizen of the United States, residing at 4 Queen Victoria Street, in the city of London, England, have invented new and useful Improvements in and connected with Elevators or Lifts, of which the following is a specification.

This invention relates more particularly to the class of elevators or lifts which are actuated by hydraulic pressure; but the invention may also be applied to steam or other like pressure apparatus.

The invention consists in the hereinafter-described improvements whereby the valve governing the main cylinder is actuated and the motion of the cage regulated.

In order that the invention may be clearly understood, reference is made to the accompanying drawings, which form part of this specification, and in which—

Figure 1:
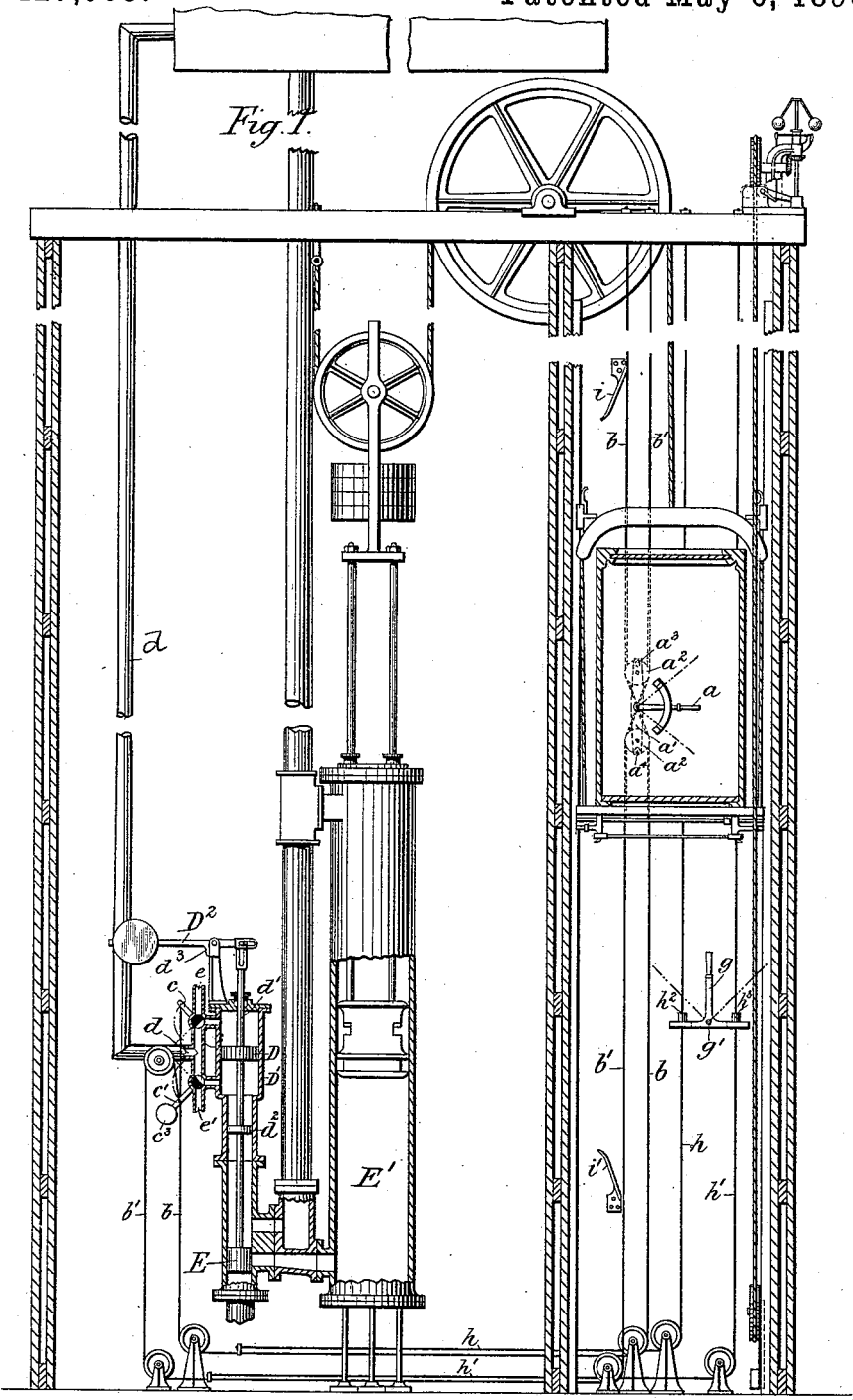
Figure 2:
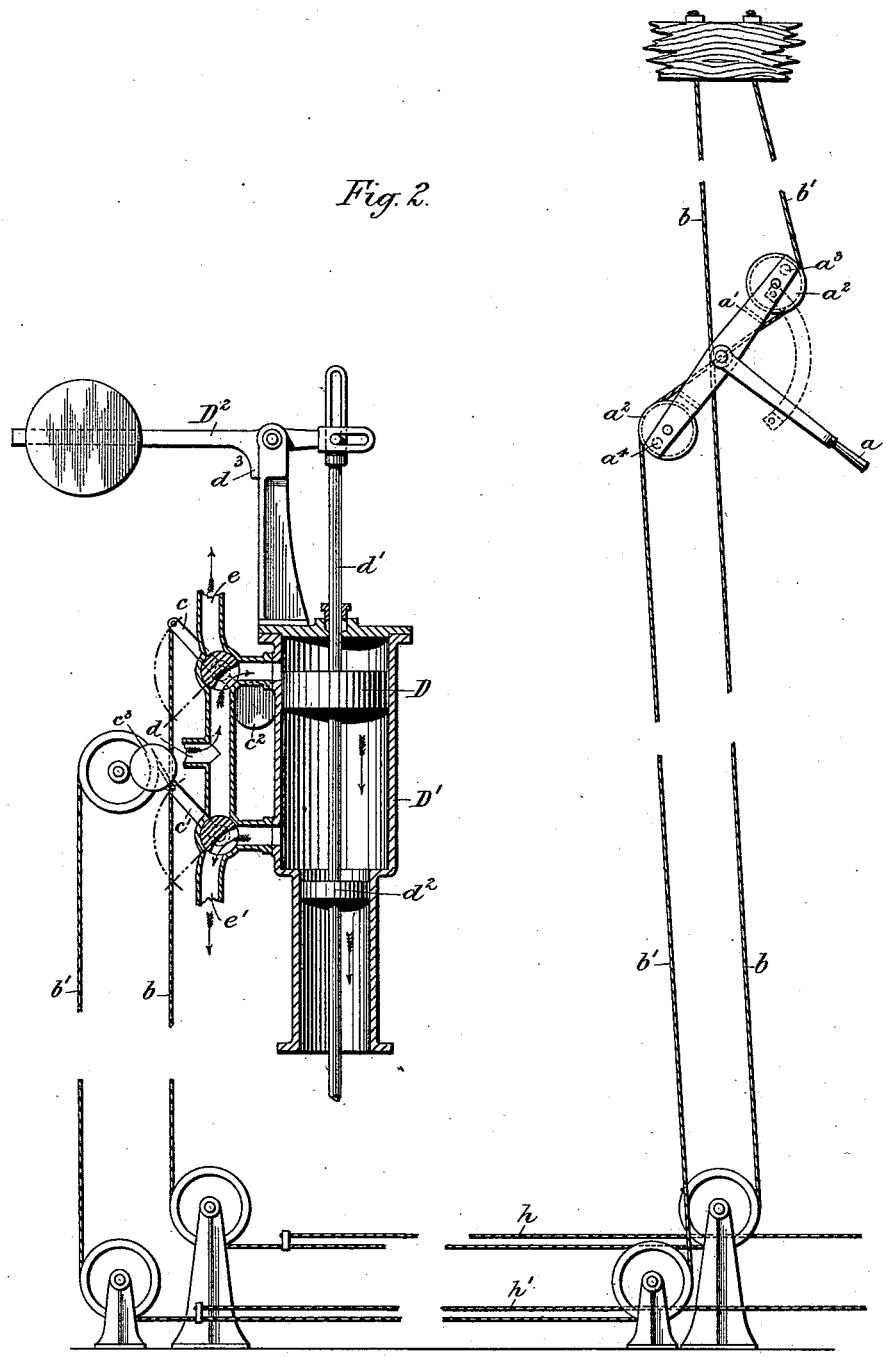

Figure 1 is a general elevation, partially in section, of an elevator or lift to which the invention has been applied, the valve-operating mechanism being in its midway or normal position. Fig. 2 is a sectional elevation, on a larger scale, of the valve-operating mechanism when in position to hold the discharge open from the actuating-cylinder; and Fig 3, a corresponding view when the valve-operating mechanism is in position to hold the said discharge closed.

An operating-handle $a$ is placed in the cage and is connected with a pivoted lever $a'$, carrying two wheels or disks $a^2\ a^2$, which ride freely on the valve-operating ropes or wires $b\ b'$, of which there are two, said ropes or wires being secured at the top to the elevated frame-work and crossing between the wheels or disks $a^2\ a^2$, so that as the handle $a$ is moved both wheels or disks will press upon the one rope or wire $b$ or $b'$, the other being allowed to straighten and consequently become more or less slack. The ropes or wires $b\ b'$, after passing around suitable guide-pulleys, are attached to separate valves $c\ c'$, normally in position to leave the pressure open through a common pipe $d$ to both sides of a piston D in a pressure-cylinder D'. The rod or stem $d'$ of said piston passes through a suitable stuffing-box, and is slotted, so as to allow for upward play without moving a counterbalanced lever $D^2$, the weight upon which is sufficient when the pressure upon both sides of the piston D is equal to raise said piston, its rod $d'$, and a second smaller piston $d^2$, mounted thereon and resting in a smaller part of said cylinder D; or, as shown, said piston $d^2$ may be made to form the top or balance pressure-piston of the main valve. It will be seen that any movement of the pistons and rod $d'$ will operate the valve E, governing the main or lifting cylinder E'; but the operation of this valve being well known description thereof is deemed unnecessary.

The action of the counterbalance-lever $D^2$ is limited by a suitable stop $d^3$ to raising the piston D to the middle of its stroke, in which position it has so operated the valve E as to cause the cage to be held in its then position, as shown in Fig. 1. When the piston D is at the top of its stroke, if the handle $a$ be placed and held in the position shown in Fig. 2, the wheels or disks $a^2$ will draw up the rope or wire $b'$, thus closing valve $c'$ to inlet and opening the discharge from between the pistons D $d^2$ through pipe $e'$, the result being that as rope $b$ is not operated the counterweight $c^2$ (or a spring may be employed) keeps valve $c$ in its normal position or open as between the pressure-pipe $d$ and the top of the piston D, upon the opposite sides of which there will then be an unequal pressure and a consequent movement thereof in the direction of least resistance, as indicated by the arrows, with a corresponding movement of the valve E, governing the main or lifting cylinder. If the operating-handle $a$ be then released it will return to its normal position, the relaxed pressure upon the operating rope or wire $b'$ permitting counter-weight $c^3$ to return its connected valve $c'$ to its normal position, closing the discharge $e'$ and opening the pressure-supply from $d$ to between the pistons, so that the pressure upon either side of the piston D is again equalized; but if the piston is at the top of its stroke the extra pressure upon the second or smaller piston $d^2$ will, through their common rod $d'$, be sufficient to bring the larger piston to the center of its stroke, as shown in Fig. 1, the excess water beneath piston D, which cannot be contained in the smaller portion of the cylinder, circulating through the valves $c'$ $c$ to the top thereof. When the piston D reaches its central position, any further downward movement will be prevented by the counterbalanced lever $D^2$. If, however, instead of releasing the handle $a$, it is held in the position shown in Fig. 2, the excess pressure upon the top of the piston D will cause it to continue its stroke and raise the counterbalance-lever $D^2$ into the position shown in Fig. 3, when, if the handle $a$ be allowed to return to its normal position, thus leaving the supply open through both valves $c$ $c'$, the pressure upon the opposite sides of D will be equalized, while the effect of the extra pressure upon the top of piston $d^2$, together with the weight of the rod and connected parts, will be overcome by the counter-balance $D^2$, which will raise piston D to the position shown in Fig. 1, the water from above piston D circulating through valves $c$ $c'$ to the under side of the piston. To hasten the action or to cause the piston D to complete its upward stroke, it is only necessary to move and hold the handle in the position indicated in Fig. 3, as this will close the supply to the top of said piston and open it to discharge through pipe $e$. With this construction, should both of the operating ropes or wires break, the action of their valves $c$ $c'$ would automatically cause the cage to be stopped and held in its then position, while if only one should break it would still be possible to move the cage in one direction and stop it when desired, while as a still further security a second set of operating ropes or wires $h$ $h'$ may be placed in the well, provided with an operating-handle $g$ at each floor, so that the motion of the cage may be governed independently of the cage-handle. This arrangement is most completely shown in Fig. 1, where, to avoid confusion in the drawings, a single handle is shown, it being understood that duplicates thereof may be placed at each floor or level, as may be desired. The supplementary valve ropes or wires $h$ $h'$ are shown as connected with ropes or wires $b$ $b'$; but it will be evident that they may be continued to the valves $c$ $c'$, if deemed necessary. The handle $g$ is shown as being pivoted at $g'$, and stops $h^2$ $h^3$ as being placed upon the ropes $h$ $h'$, so that if the said handle be moved to either side, as indicated in dotted lines, there will be a corresponding movement of the valve $c$ or $c'$, as the case may be.

In order that there may be no possible overtravel of the cage, curved or other stops $i$ $i'$ are placed at the top and bottom of the well, so that the operating-handle $a$ will be automatically brought to its normal position by reason of the contact of pins or projections $a^3$ $a^4$ with said stops $i$ $i'$, the result being that piston D will return to its central or normal position and the cage be stopped more or less rapidly, depending upon the rapidity of the action of said piston.

When the water-supply to operate the lift is taken from a tank or other limited source of supply, it might sometimes happen that an attempt would be made to operate the elevator when the supply of water was insufficient. To prevent this the motor-supply pipe $d$ is connected to the source of supply above the level of the connection to the main cylinder.

I do not in this application claim the elevator-controlling device located in the cage, as such device forms the subject-matter of another application of mine, Serial No. 301,312, filed February 27, 1889.

What I claim, and desire to secure by Letters Patent, is—

1. In an elevator or lift, the combination, with the main or lifting cylinder and its supply-pipe, of a valve-motor cylinder and its supply-pipe, the latter being connected to the source of supply at a higher level than the main cylinder, substantially as and for the purposes set forth.

2. In an elevator, the combination, with the main or lifting cylinder and the main valve controlling the supply of fluid thereto, of a valve-motor cylinder having two parts and pistons of different diameters, and a counterbalance, and provided with a supply-pipe, the governing-valves located in the said pipe, the operating-ropes attached thereto, and the valve-actuating weights, the parts being adjusted substantially as described, whereby on the breaking or stretching of either of the said ropes the corresponding valve will remain in or return to its normal position, substantially as and for the purpose set forth.

3. The combination, with the main or lifting cylinder and the main governing-valve, of a valve-motor cylinder having two parts and pistons of different diameters, a counterbalance, a supply-pipe therefor, two valves governing the supply to the said motor-cylinder, and two separate operating-ropes connected with each valve, substantially as set forth.

4. In an elevator or lift, the combination, with the valve governing the main cylinder, of a valve-motor cylinder containing a main and a supplementary or second piston, a slotted piston-rod connecting both pistons and the main valve, a lever carrying a counter-weight attached to said rod by a pin moving in the said slot, and valves for governing the supply to the motor-cylinder, all substantially as and for the purposes set forth.

5. The combination, with the main or lifting cylinder and the main valve controlling the supply of fluid thereto, of a valve-motor cylinder having parts of different diameters and pistons fitting the two said portions of the motor-cylinder and connected with the main valve, and a counter-balance opposed to the piston in the smaller portion of the cylinder, substantially as described.

6. The combination, with the main or lifting cylinder and the main valve controlling the supply of fluid thereto, of a valve-motor cylinder having parts of different diameters, a counterbalanced piston therein connected with the main valve, a supply-pipe for the said motor-cylinder, the governing-valves located in the supply-pipe, the operating-ropes connected with the said governing-valves, and the actuating-weights for the governing-valves, substantially as described.

In testimony whereof I have hereunto set my hand in the presence of two subscribing witnesses.

THOS. P. FORD.

Witnesses:
 PHILIP M. JUSTICE,
 ALLEN P. JONES.